United States Patent
Harkcom

(10) Patent No.: US 8,287,392 B2
(45) Date of Patent: Oct. 16, 2012

(54) SPLIT SPACER RING FOR REMOVAL OF CUTTERBAR DRIVE PTO

(75) Inventor: Melanie W. Harkcom, New Holland, PA (US)

(73) Assignee: CNH America LLC, New Holland, PA (US)

( * ) Notice: Subject to any disclaimer, the term of this patent is extended or adjusted under 35 U.S.C. 154(b) by 200 days.

(21) Appl. No.: 12/837,442

(22) Filed: Jul. 15, 2010

(65) Prior Publication Data

US 2012/0011948 A1   Jan. 19, 2012

(51) Int. Cl.
*F16D 3/84* (2006.01)
(52) U.S. Cl. ............ 464/172; 464/177; 56/DIG. 24
(58) Field of Classification Search .............. 464/170, 464/172, 177, 176; 56/DIG. 24; 74/609; 180/346

See application file for complete search history.

(56) References Cited

U.S. PATENT DOCUMENTS

| | | | |
|---|---|---|---|
| 1,240,302 A * | 9/1917 | Branstrator | ............ 180/346 |
| 1,784,667 A | 12/1930 | Gillet | |
| 2,064,392 A * | 12/1936 | Swenson et al. | ........ 464/172 X |
| 2,585,405 A | 2/1952 | Reiter | |
| 2,911,239 A | 11/1959 | Marzolf, Sr. | |
| 3,504,508 A * | 4/1970 | Bornzin | ........ 464/172 X |
| 3,761,114 A | 9/1973 | Blakeley | |
| 4,023,836 A | 5/1977 | Applehans | |
| 4,283,905 A | 8/1981 | van der Lely | |
| 4,292,790 A | 10/1981 | Mathews | |
| 4,314,436 A | 2/1982 | van der Lely | |
| 4,500,096 A | 2/1985 | Tuttle et al. | |
| 4,501,573 A * | 2/1985 | Bondioli | .............. 464/172 |
| 4,860,527 A | 8/1989 | Maarten | |
| 6,644,401 B1 | 11/2003 | Miller | |

* cited by examiner

*Primary Examiner* — Gregory Binda
(74) *Attorney, Agent, or Firm* — Patrick M. Sheldrake

(57) ABSTRACT

A split spacer ring that is connectable to a cutterbar PTO drive shaft and works in conjunction with an anti-wrap shield to reduce the effects of crop debris accumulating on the drive shaft. Radial removal of the split spacer ring allows the anti-wrap shield to be axially displaced to enable sufficient telescoping movement of the drive shaft to disengage an end from a rotary cutterhead connection and thereby remove the drive shaft or other cutterbar components for repair or replacement. Improved axial clearance provided by the removed spacer ring also facilitates installation and removal of a crop conveying drum that may be installed on the drive shaft.

11 Claims, 3 Drawing Sheets

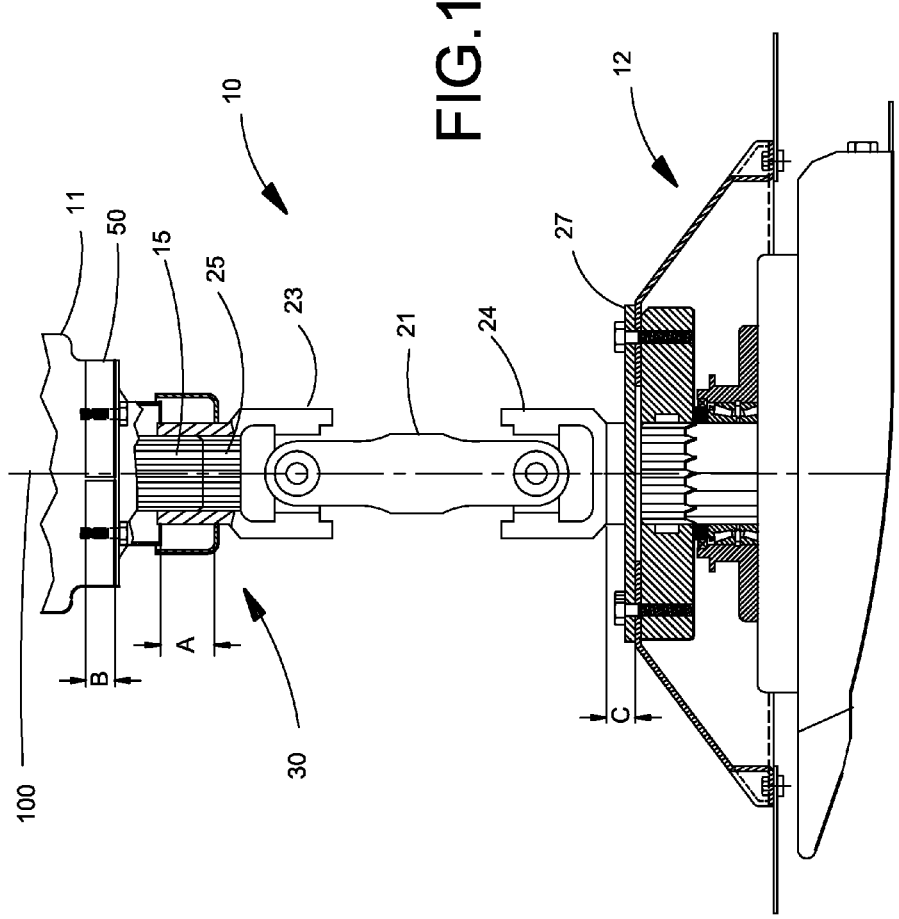

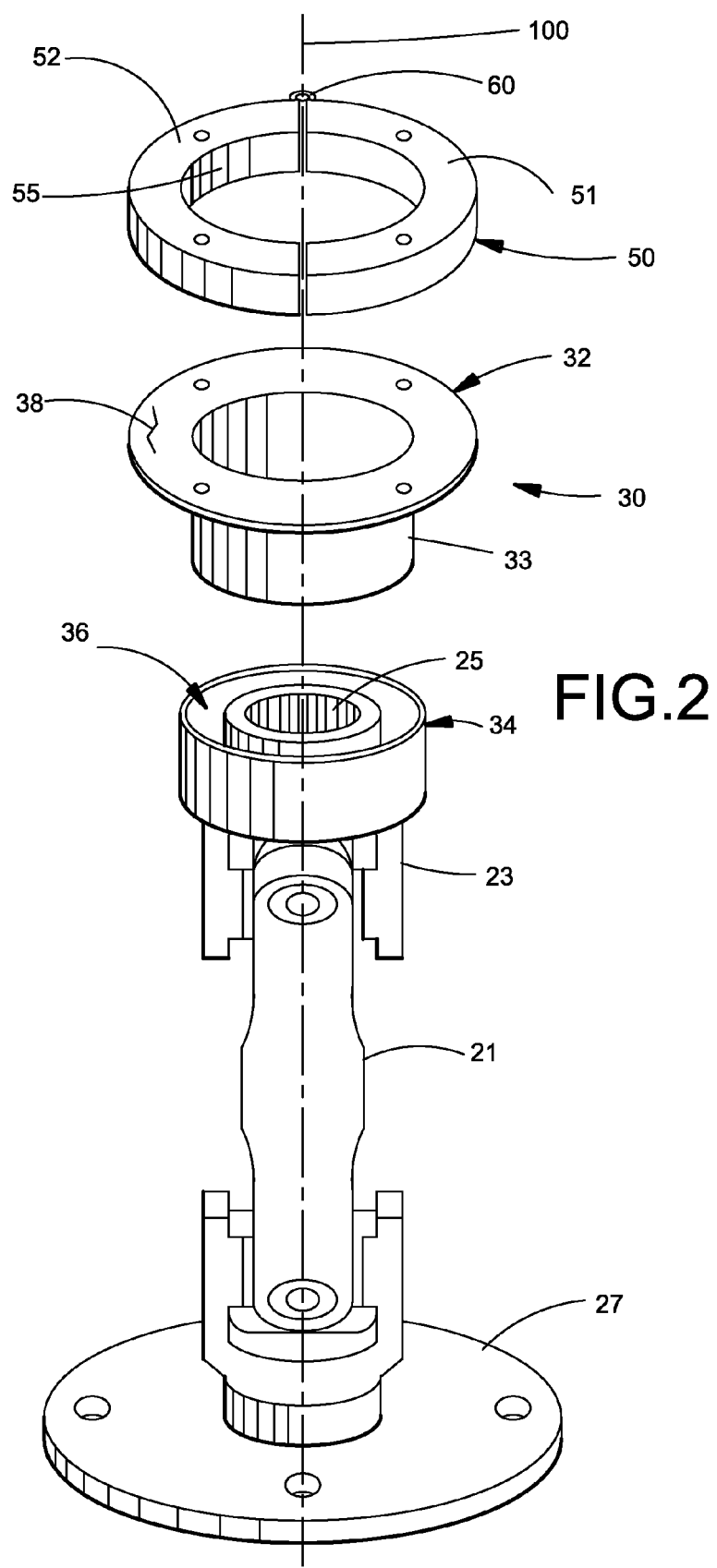

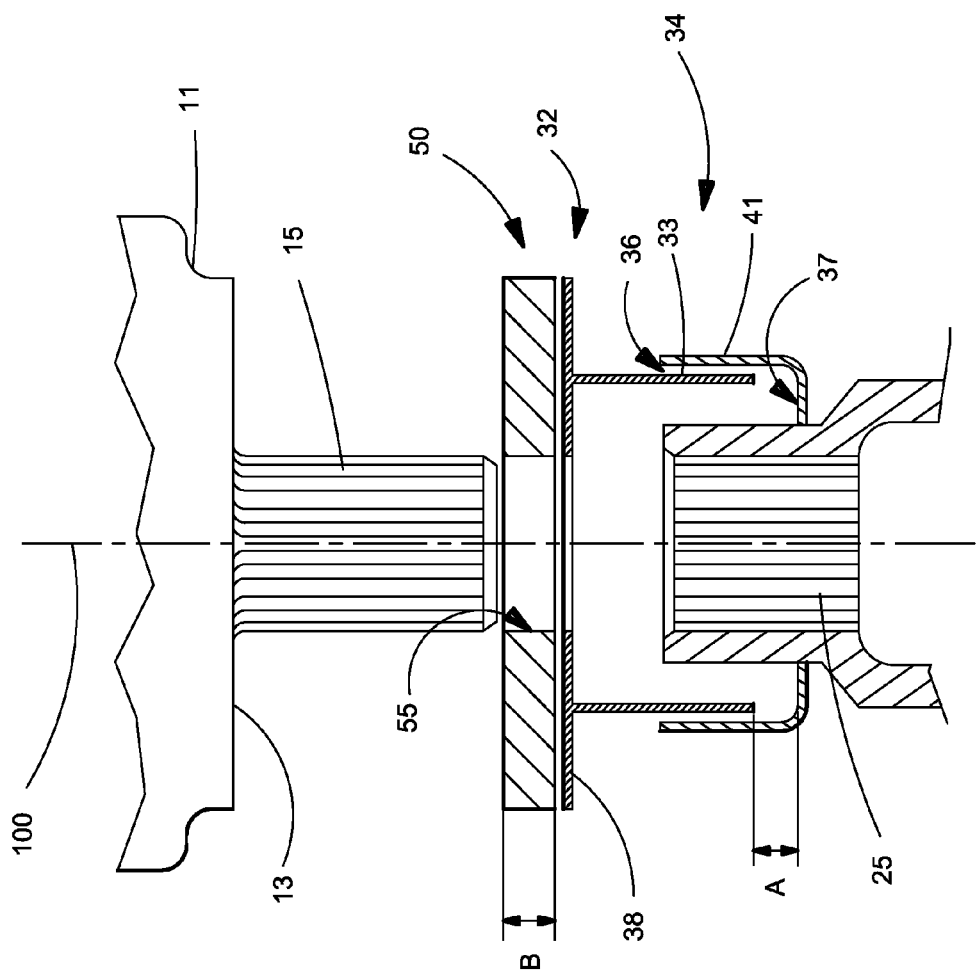

US 8,287,392 B2

SPLIT SPACER RING FOR REMOVAL OF CUTTERBAR DRIVE PTO

BACKGROUND OF THE INVENTION

This invention relates generally to a machine for harvesting crops in a field and, more particularly, to a split spacer ring in a cutterbar drive power takeoff that facilitates disassembly of the drive.

In modern crop harvesting machines, such as those having rotary disc cutterbars, one or more power take-off (PTO) shafts driving the cutterbar extend through the crop flow path downstream of the cutting location. Debris from the crop stream is prone to wrapping around these rotating shafts and potentially binding the shafts. Anti-wrap shields are often fitted around these shafts to reduce the debris accumulations and to protect seals where the shafts enter the cutterbar drive or gearbox. A stationary anti-wrap shield fits inside a cup-like structure on the lower side of the gearbox to form a labyrinth seal to protect the gearbox seal from damage due to upwardly migrating crop debris on the shaft. Crop conveying drums may also be connected directly to the drive shaft for further reducing crop debris accumulation on the shaft.

Removal of the cutterbar drive PTO shaft, drums, or any of the cutterbar components below the PTO for repair or replacement requires telescoping the shaft upward on the gearbox shaft and then angled outwardly at the bottom to clear the top of the cutterbar drive connection. Telescoping the PTO shaft upward requires that the cup-like portion of the labyrinth seal also telescope upward relative to the anti-wrap shield. However, the cup tends to fill with crop dust which can impede upward displacement of the cup and thus prevent shaft disassembly. Tight labyrinth clearances prevent dust removal with the structure in place.

Accordingly, it would be desirable to provide an easily removable spacer as part of the labyrinth shield structure that device that would, once removed, permit upward telescoping movement of the drive shaft to allow driveshaft removal to overcome the above problems and limitations. Further advantages would be realized by an easily removable spacer ring that could ease assembly of other components on the PTO drive shaft by providing additional axial clearance along the shaft when the spacer ring is removed.

SUMMARY OF THE INVENTION

Accordingly, the present invention, in any of the embodiments described herein, may provide one or more of the following advantages:

It is an object of the present invention to provide a split spacer ring disposed between an anti-wrap shield and the downward-facing surface of a cutterbar PTO drive gearbox that will allow sufficient upward telescoping movement of the PTO drive shaft for removal when the spacer ring is removed.

It is a further object of the present invention to provide a removable spacer ring for the cutterbar PTO driveshaft that is easily removable, even following machine operation when the drive shaft may be covered in crop debris.

It is a still further object of the present invention to provide a removable spacer that comprises a portion of a shaft seal protecting apparatus on a cutterbar PTO drive shaft.

It is a still further object of the present invention to provide a removable spacer ring for use on a cutterbar PTO drive shaft that is durable in construction, inexpensive of manufacture, carefree of maintenance, easily assembled, and simple and effective to use.

These and other objects are achieved according to the instant invention by providing a split spacer ring that is connectable to a cutterbar PTO drive shaft and works in conjunction with an anti-wrap shield to reduce the effects of crop debris accumulating on the drive shaft. Radial removal of the split spacer ring allows the anti-wrap shield to be axially displaced to enable sufficient telescoping movement of the drive shaft to disengage from a rotary cutterhead connection and thereby remove the drive shaft or other cutterbar components for repair or replacement. Improved axial clearance provided by the removed spacer ring also facilitates installation and removal of a crop conveying drum that may be installed on the drive shaft.

BRIEF DESCRIPTION OF THE DRAWINGS

The advantages of this invention will be apparent upon consideration of the following detailed disclosure of the invention, especially when taken in conjunction with the accompanying drawings wherein:

FIG. 1 is a side elevation view of a PTO drive shaft used on a typical rotary cutter head cutterbar of the type on which the present invention is useful;

FIG. 2 is an exploded perspective view of the elements comprising the PTO drive shaft partial; and FIG. 3 is a detail view of the gearbox connection end of the PTO drive shaft shown in FIG. 2.

DESCRIPTION OF THE PREFERRED EMBODIMENT(S)

Many of the fastening, connection, processes and other means and components utilized in this invention are widely known and used in the field of the invention described, and their exact nature or type is not necessary for an understanding and use of the invention by a person skilled in the art, and they will not therefore be discussed in significant detail. Also, any reference herein to the terms "left" or "right," "up" or "down," or "top" or "bottom" are used as a matter of mere convenience, and are determined by standing at the rear of the machine facing in its normal direction of travel. Furthermore, the various components shown or described herein for any specific application of this invention can be varied or altered as anticipated by this invention and the practice of a specific application of any element may already be widely known or used in the art by persons skilled in the art and each will likewise not therefore be discussed in significant detail. When referring to the figures, like parts are numbered the same in all of the figures.

Referring first to FIG. 1, a cutterbar PTO drive 10 for transferring rotational energy from a gearbox 11 to a rotary cutterhead 12. Multiple transversely spaced-apart cutterheads are rotationally interconnected to form a cutterbar on a typical crop harvesting head. Gearbox 11 and cutterhead 12 are conventionally attached to a frame in a fixed spatial relationship which establishes a fixed separation distance between the gearbox and the cutterhead. Rotational power is provided to the cutterheads by one or more cutterbar PTO drives such as drive 10 shown, which spans the fixed distance between the gearbox and cutterhead. The general operation and construction of a disc cutterbar can be found in U.S. Pat. No. 5,996,323, issued on Dec. 7, 1999, to Campbell, et al, the descriptive portions of which are incorporated herein by reference.

Drive 10 comprises a drive shaft 21 having a pair of universal joints 23, 24, one at each end of the shaft 21, to accommodate misalignment between the gearbox 11 and cutterhead 12 shaft connections. A gearbox output shaft connector 15 provides a torque-transferring connection for the drive shaft 21 to the gearbox output while a cutterhead connector flange 27 rotatably connects the shaft 21 to the cutterhead drive mechanism. The connector 15 is configured to interface with shaft connector 25 on the drive shaft 21 so that rotational energy may be transferred from the gearbox to the cutterhead via the shaft while allowing axial movement of the shaft 21 in relation to the gearbox to prevent binding in the PTO drive 10 during cutterbar operation. The connector 15 and shaft connector 25 interface is preferably a splined connection which enables limited axial movement of the shaft 21 relative to the gearbox. This movement is necessary to prevent binding of the shaft during operation and to enable the shaft to be removed for maintenance or repair.

Now referring to FIGS. 2 and 3 in conjunction with FIG. 1, the splined interface 15, 25 is typically protected by a shield structure 30 to limit debris contamination of the splines and to limit debris accumulation at the outer faces of seals where the connector shaft end 15 penetrates the gearbox. In the preferred embodiment shown, the gearbox connection splined interface 15, 25 is allowed limited, unrestrained axial movement. Thus, it is desirable to shield the splined interface 15, 25 from debris. Shield structure 30 comprises a shaft cup 34 attached to the drive shaft 21 and a non-rotating anti-wrap shield 32 that is preferably connected to the gearbox to protect a shaft seal installed where gearbox connector shaft 15 penetrates the gearbox housing. Both the shaft cup 34 and the anti-wrap shield 32 feature openings aligned along shaft axis 100 through which the drive shaft and/or gearbox output connector 15 extend. Shaft cup 34 is connected to the drive shaft 21 for rotation therewith and is configured to create an annular recess 36 radially displaced from the drive shaft spline connector 25 outer surface. Anti-wrap shield 32 is non-rotatingly connected to the gearbox housing, preferably using a connection flange 38 mating to a flange surface 13 on the gearbox housing, and has a cylindrical extension 33 that is configured to fit into the annular recess 36 when installed on the shaft to form a labyrinth structure to minimize debris accumulation at the spline interface and seal face area surrounding the gearbox output shaft 15.

Removal of the drive shaft 21 for maintenance or repair requires disconnecting the drive flange 27 from the cutterhead to allow the drive shaft 21 to move axially. The drive shaft 21 is then slid upwardly a first distance as allowed by the splined connection 15, 25 at the gearbox until the drive shaft 21 and flange 27 are disengaged from the cutterhead, shown as dimension C in FIG. 1. Axial movement in the direction of "C" in FIG. 1 of 1 to 1½ inches is typically sufficient to disengage the cutterhead connection. The upward axial displacement of shaft 21 necessary to disengage the cutterhead connection is less than the axial displacement that may be accommodated by the gearbox splined connection 15, 25 absent any interference from the shield structure 30. Moving the lower end of the drive shaft laterally then allows the shaft 21 to be slid downwardly from the gearbox connection interface 15, 25 so that the driveshaft can be removed.

Since shaft cup 34 is typically connected to the shaft 21, upward movement of the shaft requires upward movement of the cup 34. Any debris present in the annular recess 36 or even the limited clearance between the cylindrical extension 33 and the bottom surface 37 of the annular cup (shown as dimension "A" in FIGS. 1 and 3) can limit the amount of upward axial movement of the drive shaft 21 (i.e., effectively reduce dimension A) and thus prevent removal of the shaft. The nature of the labyrinth arrangement of the anti-wrap shield 32 and the shaft cup 34 precludes removal of these items without axial displacement to separate the labyrinth structures.

The present invention incorporates a removable split spacer ring 50 configured for positioning between the gearbox housing 11 and the anti-wrap shield 32. Removal of the spacer allows axial movement of the anti-wrap shield 32 (distance B) which combined with the axial clearance normally available between the anti-wrap shield 32 and the shaft cup 34 (dimension "A" less any debris obstruction in the annular recess 36) that is sufficient (equal to or greater than dimension "C") to allow the input shaft connection 15, 25 to be disengaged. The split ring spacer 50 is an annular spacer ring having an internal aperture 55 of sufficient diameter to allow the gearbox output shaft connector 15 to pass therethrough without impeding rotation of the shaft connector. Split spacer ring 50 comprises two portions 51, 52 which divide the spacer generally into halves along a plane generally parallel to the shaft axis 100. When installed, the split ring spacer 50 is clamped into a non-rotating position by mounting bolts or equal used to secure the anti-wrap shield to the gearbox housing. The split ring spacer may be separated once the mounting bolts are removed by withdrawing the spacer portions 51, 52 radially from their normal positions surrounding the gearbox connector 15 without requiring axial movement of the spacer portions. The split ring spacer 50 has a thickness measured in the axial direction (shown as dimension "B" in FIG. 3) that is sufficient to provide the additional clearance, once removed, necessary for relative axial displacement of the anti-wrap shield 32 and the shaft cup 34 to allow removal of shaft 21. Additionally, removal of the split ring spacer 50 from the drive shaft provides additional axial clearance on the drive shaft 21 that may benefit installation of other appurtenances on the shaft, such as crop conveying drums that are commonly used on such drive shaft installations.

In the embodiment shown, the split ring spacer 50 comprises two identical, separable portions which benefits manufacturing efficiency. Other separation proportions are permissible as long as the interior opening 55 is sufficient large to allow radially removal from around the gearbox connector 15. It may also be desirable to include a hinged connector 60 aligned parallel to the longitudinal axis 100 to connect the two portions 51, 52 of the spacer 50 to minimize the risk of part misplacement during disassembly.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention.

Having thus described the invention, what is claimed is:

1. A PTO drive shaft for connecting a driver output shaft end to an input shaft end powering a cutterbar assembly on an agricultural crop harvester comprising:
   an elongate PTO drive shaft for rotatably connecting a cutterbar input shaft and a gearbox output shaft, said PTO drive shaft having a rotating axis and a telescoping connector at one end for connecting to said output shaft, and a selectively removable connector for connecting to said input shaft at the opposing end;
   a first guard structure connected to and encircling said drive shaft for rotation therewith, said first guard structure configured to define an annular space around a first of said drive shaft connectors;

a second guard structure having a generally cylindrical extension encircling and spaced apart from said first drive shaft connector, said second guard structure extending into said annular space in a labyrinth arrangement with said first guard structure; and a spacer ring configured for disposition between said second guard portion and the gearbox, said spacer ring having a thickness along said rotating axis and being separable into at least two portions such that said at least two portions may be withdrawn radially to provide clearance for axial movement of said second guard structure thereby enabling selective axial movement of said drive shaft generally equal to said thickness.

2. The drive shaft of claim 1, wherein said telescoping connector is a splined connector.

3. The drive shaft of claim 2, wherein said at least two spacer ring portions are connected by a hinge.

4. A removable crop anti-wrap guard for a connection in a PTO drive shaft assembly connecting a output shaft to a drive flange powering a cutterbar on a crop harvester, the output shaft extending from a mounting surface—generally opposing said drive flange, the mounting surface and the drive flange being spaced apart by a generally fixed distance, said anti-wrap guard comprising:

an elongate PTO drive shaft having opposing ends;

a first shaft connector disposed on a first end of said drive shaft configured to allow selective axial displacement relative to said first shaft;

a second shaft connector disposed on a second end of said drive shaft configured for connection to said drive flange and to allow selective disconnection by axial displacement of said drive shaft relative to said drive flange, axial displacement by a first distance of said second shaft connector enabling said second shaft connector to be disengaged from said drive flange;

a first guard structure connected to and encircling said first shaft connector for rotation therewith, said first guard structure configured to define an annular space around said first shaft connector;

a second guard structure having a generally cylindrical extension encircling and spaced apart from said first shaft connector, said second guard structure extending into said annular space and concentrically aligned with said first guard structure in a labyrinth arrangement; and a spacer ring disposed between said second guard structure and said first mounting surface, said spacer ring having a thickness along said rotating axis and being separable into at least two portions such that said at least two portions may be withdrawn radially to provide clearance for axial movement of said second guard structure thereby enabling selective axial movement of said drive shaft generally equal to said thickness.

5. The anti-wrap guard of claim 4, wherein said thickness is greater than said first distance.

6. The drive shaft of claim 5, wherein said first shaft connector is a splined connector.

7. The anti-wrap guard of claim 6, wherein said at least two spacer ring portions are connected by a hinge.

8. In a crop harvesting machine having a frame supporting a gearbox and a cutterbar, the gearbox having an output shaft end aligned on a rotational axis, the cutterbar having an input connector aligned on the rotational axis and spaced apart from the output shaft end, the improvement in a drive shaft connecting the input connector and output shaft ends comprising:

an elongate PTO drive shaft for rotatably connecting the input connector and the output shaft end, said PTO drive shaft having a telescoping connector at one end for connecting to said output shaft:

a first guard structure connected to and encircling said drive shaft for rotation therewith, said first guard structure configured to define an annular space around said telescoping connector;

a second guard structure having a generally cylindrical extension encircling and spaced apart from said first guard structure, said second guard structure extending into said annular space and concentrically aligned with said first guard structure in a labyrinth arrangement with said first guard structure; and a spacer ring disposed between said second guard structure and said gearbox, said spacer ring having a thickness along said rotatational axis and being separable into at least two portions such that said at least two portions may be withdrawn radially to provide clearance for axial movement of said second guard structure thereby enabling selective axial movement of said drive shaft generally equal to said thickness.

9. The improvement of claim 8, further comprising a first shaft connector disposed on the output shaft end of said drive shaft configured to allow selective axial displacement relative to said output shaft, and a second shaft connector disposed on a second end of said drive shaft configured for connection to said input connector to allow selective disconnection by axial displacement of said drive shaft relative to said input connector, axial displacement by a first distance of said second shaft connector enabling said second shaft connector to be disengaged from said input connector, wherein said spacer ring thickness is greater than said first distance.

10. The improvement of claim 9, wherein said first shaft connector is a splined connector.

11. The improvement of claim 10, wherein said at least two spacer ring portions are connected by a hinge.

* * * * *